(12) United States Patent (10) Patent No.: US 12,654,759 B2
Tanaka et al. (45) Date of Patent: Jun. 16, 2026

(54) CONTROL DEVICE FOR MODEL CAR

(71) Applicant: FUTABA CORPORATION, Mobara (JP)

(72) Inventors: Masahiro Tanaka, Chiba-ken (JP); Yukihiro Dobashi, Mobara (JP)

(73) Assignee: FUTABA CORPORATION, Mobara (JP)

( * ) Notice: Subject to any disclaimer, the term of this patent is extended or adjusted under 35 U.S.C. 154(b) by 336 days.

(21) Appl. No.: 18/360,171

(22) Filed: Jul. 27, 2023

(65) Prior Publication Data

US 2024/0043060 A1 Feb. 8, 2024

(30) Foreign Application Priority Data

Aug. 3, 2022 (JP) ................................. 2022-124020

(51) Int. Cl.
  *A63H 17/36* (2006.01)
  *B62D 1/28* (2006.01)
  *B62D 5/00* (2006.01)
(52) U.S. Cl.
  CPC ............. *B62D 1/283* (2013.01); *B62D 5/001* (2013.01)

(58) Field of Classification Search
  CPC ........ B62D 1/283; B62D 5/001; A63H 17/00; A63H 17/36; A63H 30/04; G05B 19/0423; G05B 2219/25257
  See application file for complete search history.

(56) References Cited

U.S. PATENT DOCUMENTS

| | | | |
|---|---|---|---|
| 2015/0031268 A1* | 1/2015 | Waites | .................. A63H 17/395 |
| | | | 446/454 |
| 2015/0094880 A1* | 4/2015 | Beard | .................... A63H 17/36 |
| | | | 701/2 |

FOREIGN PATENT DOCUMENTS

| | | | | |
|---|---|---|---|---|
| CN | 112078381 A | * | 12/2020 | .............. B60L 15/20 |
| JP | H09193681 A | * | 7/1997 | ........... B60K 17/348 |

* cited by examiner

*Primary Examiner* — Tisha D Lewis
(74) *Attorney, Agent, or Firm* — BACON&THOMAS,PLLC

(57) ABSTRACT

A control device for a model car includes: a rotation sensor configured to detect a rotation number of a first wheel and a rotation number of a second wheel of a model car; and a controller configured to perform driving control of a driving source of the model car such that a rotation number difference between the first wheel and the second wheel is reduced when the rotation number difference is greater than or equal to a threshold.

8 Claims, 8 Drawing Sheets

CONTROL DEVICE FOR MODEL CAR

CROSS-REFERENCE TO RELATED APPLICATIONS

This application claims priority to Japanese Patent Application No. 2022-124020, filed on Aug. 3, 2022, the entire contents of which are incorporated herein by reference.

TECHNICAL FIELD

The present disclosure relates to a control device for a model car; and, more particularly, to driving control of a model car when wheels slip.

BACKGROUND

In a vehicle, it is suggested that slip is determined from the relationship between the rotation number of front wheels and the rotation number of rear wheels, and a torque split between the front wheels and the rear wheels is feedback-controlled, when the front wheels or the rear wheels slip, such that the difference between the rotation number of the front wheels and the rotation number of the rear wheels becomes the same as a target difference between the rotation number of the front wheels and the rotation number of the real wheels (see, e.g., Japanese Laid-open Patent Publication No. H01-111529).

SUMMARY

The wheels of model cars may slip similarly to the case of vehicles. Therefore, model cars in which traction control is performed to prevent slippage of the wheels have been developed.

However, in such model cars, an operator (user) needs to perform various settings for traction control, which may be a complicated operation for the operator.

In view of the above, the present disclosure has an object of easily reducing the slippage of a model car.

According to one embodiment of the present disclosure, a control device for a model car is provided. The control device comprises: a rotation sensor configured to detect a rotation number of a first wheel and a rotation number of a second wheel of a model car; and a controller configured to perform driving control of a driving source of the model car such that a rotation number difference between the first wheel and the second wheel is reduced when the rotation number difference is greater than or equal to a threshold.

According to the present disclosure, it is possible to easily reduce the slippage of a model car.

DETAILED DESCRIPTION

Hereinafter, embodiments of the present disclosure will be described in the following order.

<1. First Embodiment>
<2. Second Embodiment>
<3. Modification>
<4. Summary>

1. First Embodiment

Figure 1:
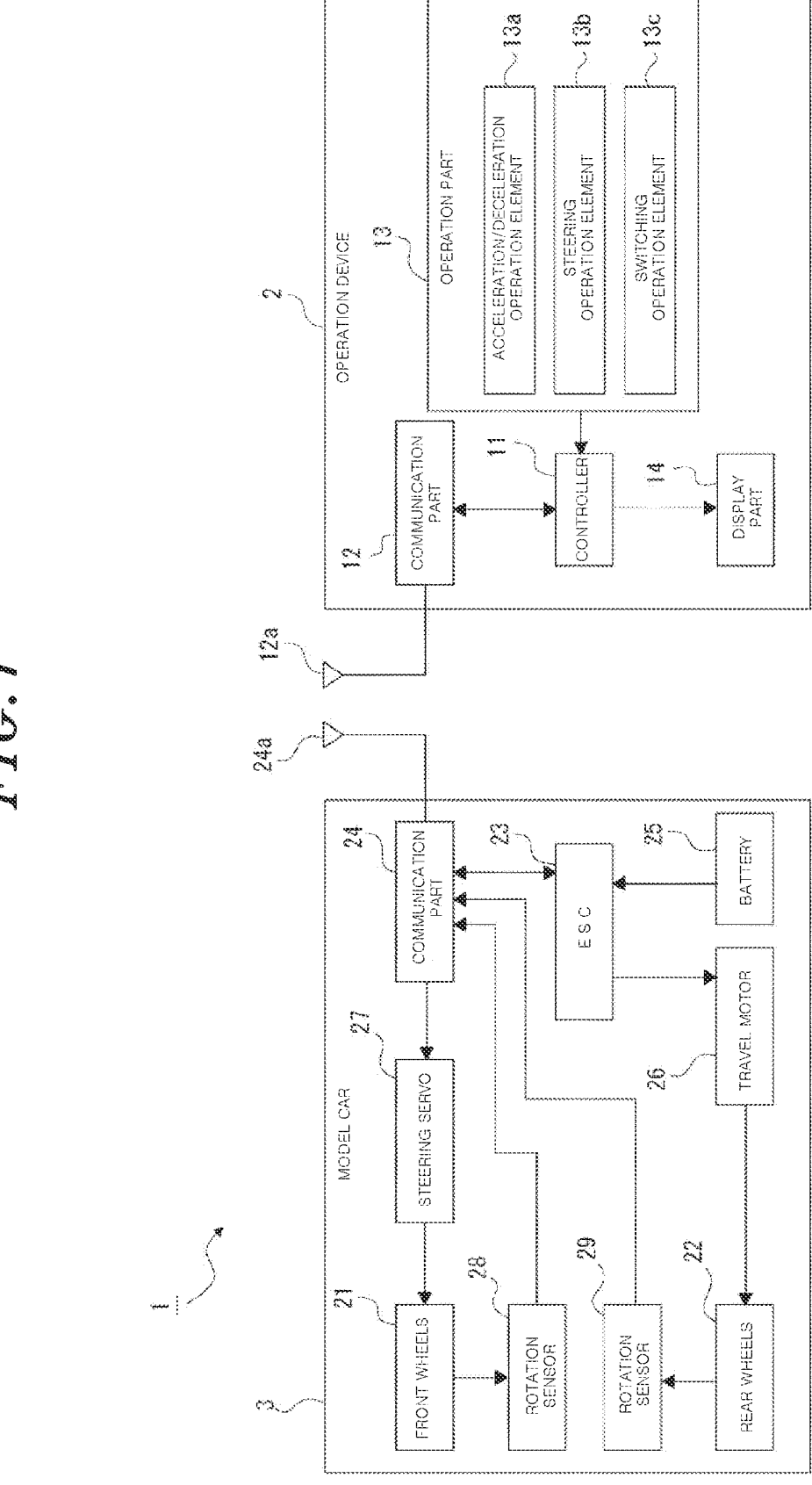
FIG. 1 explains a configuration of a radio control system 1 according to a first embodiment.

[1.1. Configuration of Radio Control System]
FIG. 1 explains a configuration of a radio control system 1 according to a first embodiment.

The radio control system 1 includes an operation device 2 that functions as a controller, and a model car 3 that is wirelessly controlled by the operation device 2.

The operation device 2 includes a controller 11, a communication part 12, an operation part 13, and a display part 14. The controller 11 is a microcomputer including, for example, a central processing unit (CPU), a random access memory (RAM), a read only memory (ROM), and the like. The CPU of the controller 11 loads a program stored in the ROM into the RAM to executes the program, thereby controlling the entire operation device 2 and controlling the operation of the model car 3.

The communication part 12 modulates signals to be transmitted (rotation control signal and steering control signal) in a predetermined communication method and transmits the modulated signals from an antenna 12a to the model car 3. When a management data signal (to be described later) is transmitted from the model car 3, the communication part 12 receives and demodulates the management data signal, and outputs the demodulated signal to the controller 11.

The operation part 13 is a stick, a wheel, a button, or the like that receives an operation of an operator. The operation part 13 includes, for example, an acceleration/deceleration operation element 13a for instructing acceleration and deceleration (braking) of the model car 3, a steering operation element 13b for instructing steering of the model car 3, and a switching operation element 13c for switching ON/OFF of traction control to be described later.

When the acceleration/deceleration operation element 13a is operated, the operation part 13 outputs a signal indicating the operation amount of the acceleration/deceleration operation element 13a to the controller 11. At this time, the controller 11 transmits a rotation control signal to the model car 3 so that a travel motor 26 (the rear wheels 22) rotates at a rotation number corresponding to the inputted signal indicating the operation amount of the acceleration/deceleration operation element 13a.

When the steering operation element 13b is operated, the operation part 13 outputs a signal indicating the operation amount of the steering operation element 13b to the controller 11. At this time, the controller 11 transmits the steering control signal to the model car 3 so that the model car 3 is steered at an angle corresponding to the inputted signal indicating the operation amount of the steering operation element 13b.

Further, the operation part 13 outputs a switching signal to the controller 11 whenever the switching operation element 13c is operated. The controller 11 switches ON/OFF of the traction control whenever the switching signal is received.

The display part 14 includes a predetermined display device such as a liquid crystal display or an organic EL display, and appropriately displays information required for driving the model car 3 depending on the display control of the controller 11.

The model car 3 includes front wheels 21, rear wheels 22, an electric speed controller (ESC) 23, a communication part 24, a battery 25, the travel motor 26, a steering servo 27, and rotation sensors 28 and 29. The model car 3 is a four-wheel vehicle that travels with two front wheels 21 and two rear wheels 22. The front wheels 21 and the rear wheels 22 have the same diameter.

The steering servo 27 is connected to the front wheels 21. The steering servo 27 is driven by the steering control signal transmitted from the operation device 2, so that the front wheels 21 are steered in response to the steering control signal and the traveling direction of the model car 3 is changed. Therefore, the front wheels 21 function as steering wheels (non-driving wheels).

The travel motor 26 is connected to the rear wheels 22. The model car 3 travels as the rear wheels 22 are rotated by the travel motor 26. Therefore, the rear wheels 22 function as driving wheels.

The ESC 23 uses the power of the battery 25 to control the rotation number of the travel motor 26 (the rear wheels 22) depending on the rotation number control signal transmitted from the operation device 2.

The battery 25 is used not only for driving the travel motor 26 via the ESC 23, but also as a power supply for individual components in the model car 3, such as the communication part 24, the steering servo 27, the rotation sensors 28 and 29, and the like.

The communication part 24 receives radio waves of the signals (the rotation control signal and the steering control signal) transmitted from the operation device 2 through the antenna 24a and demodulates them. The communication part 24 outputs the demodulated signals (the rotation control signal and the steering control signal) to the ESC 23 and the steering servo 27.

The radio control system 1 has a so-called telemetry (remote measurement) function. The communication part 24 modulates management data related to the traveling of the model car 3, such as a temperature and a voltage of the battery 25, a current value of the travel motor 26, and the like, in a predetermined communication method, and transmits the modulated data, as a management data signal, from the antenna 24a to the operation device 2.

The operation device 2 that has received the management data signal displays the management data such as the temperature and voltage of the battery 25, the current value of the travel motor 26, and the like on the display part 14 under the control of the controller 11. Accordingly, an operator can control the model car 3 while monitoring the management data displayed on the display part 14 of the operation device 24.

The rotation sensor 28 detects the rotation number of the front wheels 21 at predetermined measurement intervals, and outputs a front wheel rotation number signal indicating the detected rotation number to the communication part 24.

The rotation sensor 29 detects the rotation number of the rear wheels 22 at predetermined measurement intervals, and outputs a rear wheel rotation number signal indicating the detected rotation number to the communication part 24.

The front wheel rotation number signal and the rear wheel rotation number signal are collectively referred to as wheel rotation number signals.

The communication part 24 uses the telemetry function to transmit the wheel rotation number signals inputted from the rotation sensors 28 and 29, as a part of the management data signal, to the operation device 2. Hence, the controller 11 of the operation device 2 can constantly recognize the rotation number of the front wheels 21 and the rear wheels 22 of the model car 3.

Figure 2:
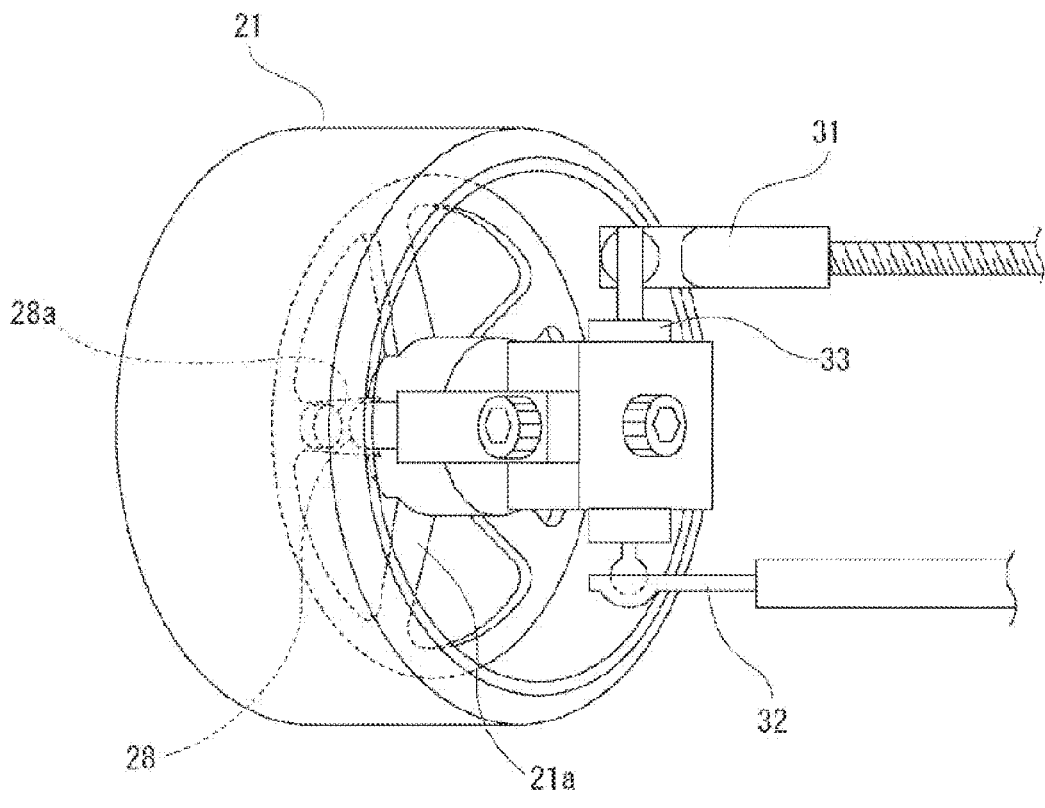
FIG. 2 explains a configuration of a rotation sensor.

FIG. 2 explains the configuration of the rotation sensor 28. In FIG. 2, a steering mechanism that is connected to the steering servo 27 to steer the front wheels 21 is omitted for convenience of description.

As shown in FIG. 2, the front wheel 21 is rotatably connected to a wheel hub 33 vertically supported between an upper arm 31 and a lower arm 32 extending from a chassis (not shown) toward the outside of the vehicle body.

The rotation sensor 28 is a magnetic sensor for detecting the rotation number based on changes in the magnetic field. The rotation sensor 28 is fixed to the wheel hub 33 so that a magnetic field detection portion faces the front wheel 21. At this time, the magnetic field detection portion of the rotation sensor 28 is fixed while being spaced by a predetermined distance in a radial direction about the rotation axis of the front wheel 21.

A magnet 28a is fixed to an inner peripheral surface 21a of the front wheel 21 on the wheel hub 33 side. The magnet 28a is fixed while being spaced by the same distance as that of the magnetic field detection portion of the rotation sensor 28 in the radial direction about the rotation axis of the front wheel 21.

Therefore, the magnet 28a and the magnetic field detection portion of the rotation sensor 28 are disposed to face each other while being spaced by the same distance about the rotation axis of the front wheel 21.

When the front wheel 21 rotates, the magnet 28a also rotates by the rotation of the front wheel 21. The rotation sensor 28 detects the rotation number of the front wheel 21 by detecting the magnetic field changed by the magnet 28a using the magnetic field detection portion.

The rotation sensor 29 has the same configuration as that of the rotation sensor 28.

[1.2. Traction Control]

Next, the traction control will be described. In the first embodiment, the controller 11 and the rotation sensors 28 and 29 function as a control device for performing the traction control.

When the model car 3 travels on a road surface (low p road surface) with a small coefficient of friction, for example, the rear wheels 22 that are the driving wheels may slip (idle). When the rear wheels 22 slip, the driving force from the travel motor 26 is not transmitted to the road surface and, thus, the model car 3 cannot travel stably.

On the other hand, when the model car 3 travels around a corner, an operator may intentionally slip the rear wheels 22 that are the driving wheels to perform so-called drift driving in which the model car 3 slides sideways.

Therefore, when the traction control is turned on by the operation of the switching operation element 13c, the traction control is performed in the radio control system 1. Accordingly, the slippage of the rear wheels 22 is eliminated at an early stage, and the model car 3 travels stably.

When the traction control is turned off by the operation of the switching operation element 13c, the traction control is not performed in the radio control system 1. Accordingly, an operator can intentionally perform the drift driving.

Figure 3:
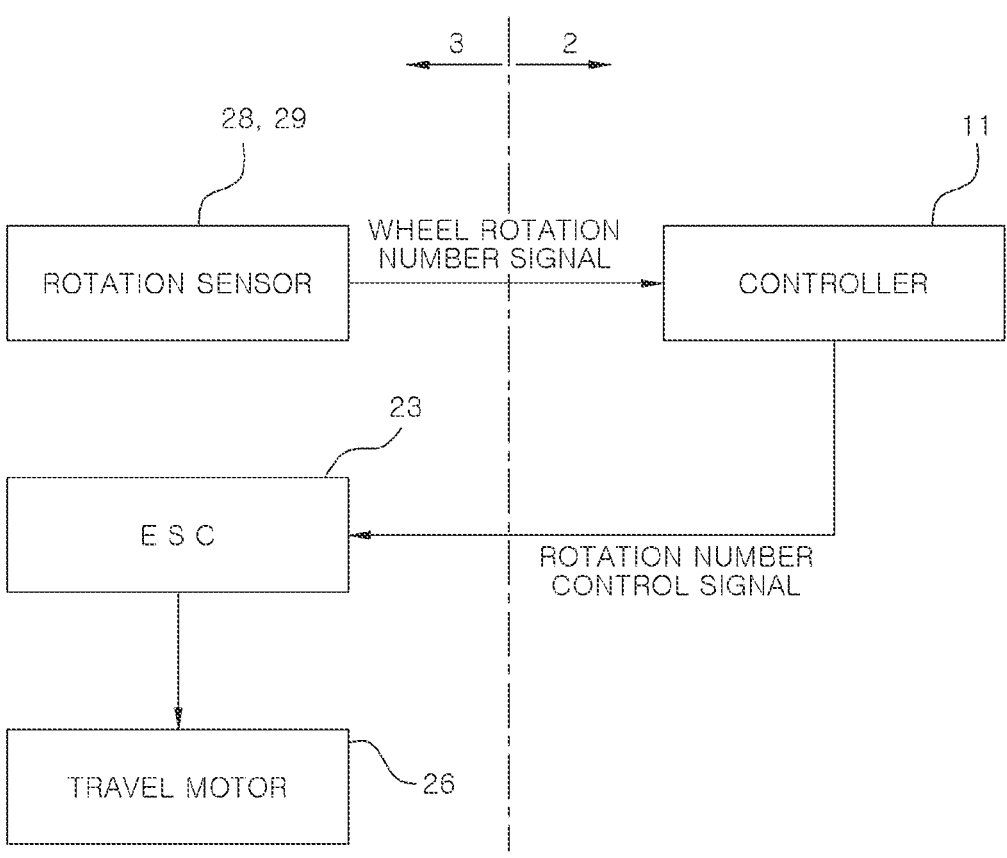
FIG. 3 explains flow of signals in traction control.

FIG. 3 explains the flow of signals in the traction control. The controller 11 of the operation device 2 receives the wheel rotation number signals from the rotation sensors 28 and 29 of the model car 3 at predetermined communication intervals. Here, the communication interval is, for example, an interval at which the communication between the operation device 2 and the model car 3 is performed.

When the wheel rotation number signals are received, the controller 11 calculates the rotation number difference between the front wheels 21 and the rear wheels 22. Here, the controller 11 calculates the rotation number difference by subtracting the rotation number (that is, the rotation number of the front wheels 21) indicated by the front wheel rotation number signal from the rotation sensor 29 from the rotation number (that is, the rotation number of the rear wheels 22) indicated by the rear wheel rotation number signal from the rotation sensor 29.

The controller 11 determines that slippage has occurred when there is a rotation number difference between the front wheels 21 and the rear wheels 22. Here, the rotation sensors 28 and 29 may have measurement errors. Therefore, the controller 11 determines that slippage has occurred when the rotation number difference between the front wheels 21 and the rear wheels 22 is greater than or equal to a predetermined threshold.

The threshold is set in consideration of the measurement errors of the rotation sensors 28 and 29, and the like.

When the tire diameters of the front wheels 21 and the rear wheels 22 are different, the rotation number difference may be calculated after the rotation number of the front wheels 21 or the rear wheels 22 is corrected in consideration of the tire diameter ratio of the front wheels 21 and the rear wheels 22.

When it is determined that slippage has occurred, the controller 11 performs the traction control such that the rotation number difference between the front wheels 21 and the rear wheels 22 is reduced (to be within a certain range). In the traction control, the controller 11 performs the feedback control to control the rotation number such that the rotation number of the rear wheels 22 is reduced as the rotation number difference between the front wheels 21 and the rear wheels 22 increases.

For example, the controller 11 transmits the rotation number control signal to the model car 3 (the ESC 23) so that the rotation number of the rear wheels 22 becomes the same as the rotation number of the front wheels 21 regardless of the operation amount of the acceleration/deceleration operation element 13a. Accordingly, the ESC 23 drives the travel motor 26 such that the rotation number of the rear wheels 22 become the same as the rotation number of the front wheels 21, which makes it possible to eliminate the slippage.

Further, the controller 11 may perform an intermittent operation for alternately switching a high rotation number state and a low rotation number state of the rear wheels 22 (the travel motor 26).

Figure 4:
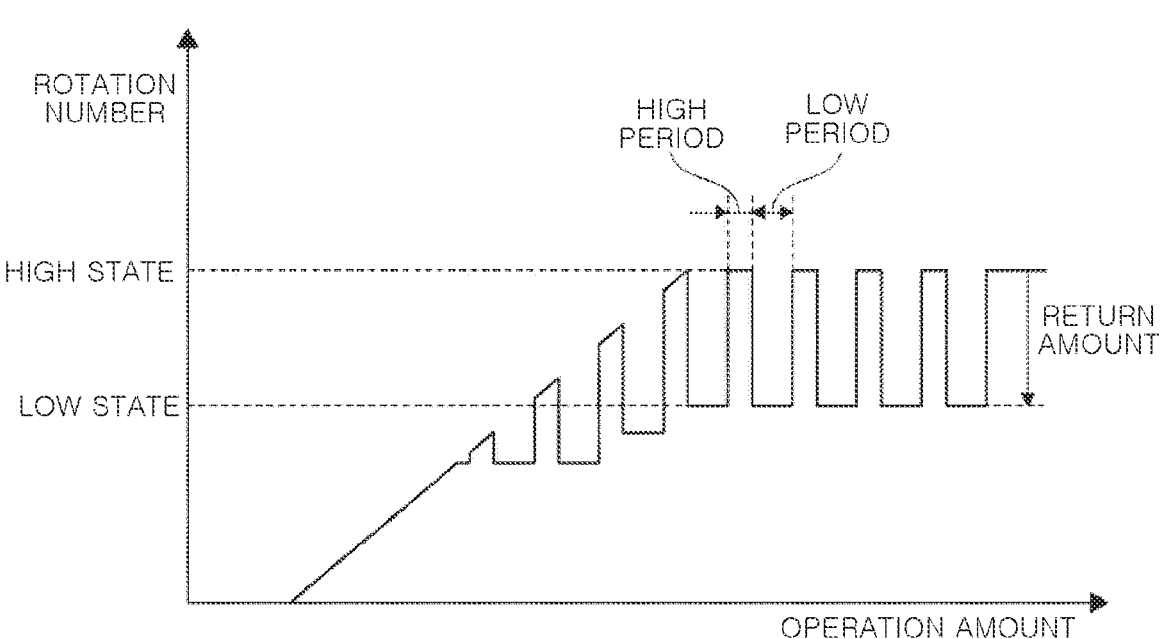
FIG. 4 explains an intermittent operation.

FIG. 4 explains the intermittent operation. As shown in FIG. 4, the controller 11 determines the rotation number of the rear wheels 22 in the high rotation number state (high state) and that in the low rotation number state (low state) of the rear wheels 22.

For example, the controller 11 determines, as the high rotation number, the rotation number corresponding to the operation amount of the acceleration/deceleration operation element 13a. Further, the controller 11 determines, as the low rotation number, the rotation number obtained by subtracting a return amount from the high rotation number. The return amount is pre-associated with the rotation number difference in such a manner that the return amount increases as the rotation number difference between the front wheels 21 and the rear wheels 22 increases.

Further, the controller 11 determines the duty ratio that is reduced as the rotation number difference between the front wheels 21 and the rear wheels 22 increases.

Here, the duty ratio is the ratio of a high period corresponding to the high state to the sum of the high period and a low period corresponding to the low state, and is pre-associated with the rotation number difference between the front wheels 21 and the rear wheels 22.

The controller 11 determines the rotation number (the rotation number in the high state and the rotation number in the low state) of the rear wheels 22 based on the rotation number, the duty ratio, and the return amount corresponding to the operation amount of the acceleration/deceleration operation element 13a, and outputs the rotation number control signal for causing the rear wheels 22 to rotate at the calculated rotation number to the model car 3. Accordingly, the ESC 23 drives the travel motor 26 to reduce the rotation number of the rear wheels 22, which makes it possible to eliminate the slippage.

The rotation number of the rear wheels 22 in the intermittent operation is not necessarily determined by the above method, and may be determined by other methods.

Figure 5:
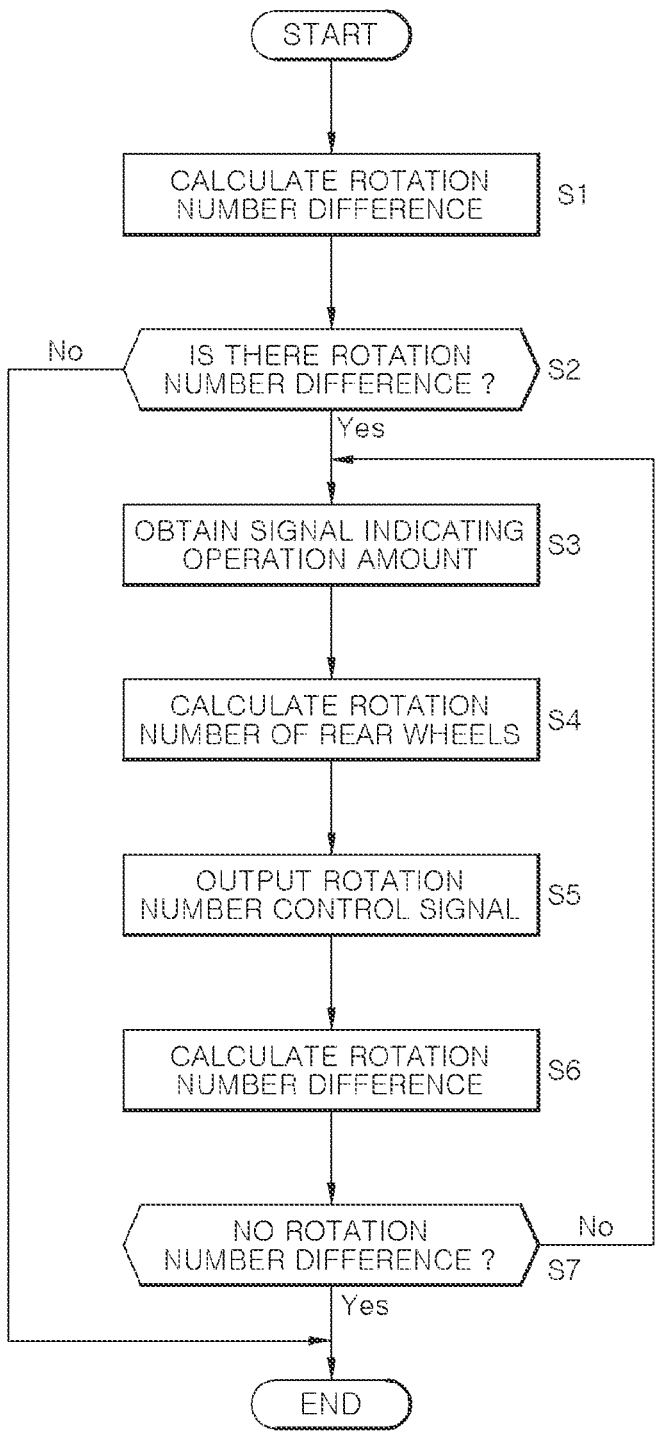
FIG. 5 is a flowchart showing flow of the traction control.

FIG. 5 is a flowchart showing the flow of the traction control. It is assumed that the controller 11 receives the wheel rotation number signals from the rotation sensors 28 and 29 at predetermined communication intervals during the traction control shown in FIG. 5.

As shown in FIG. 5, in step S1, the controller 11 calculates the rotation number difference between the front wheels 21 and the rear wheels 22 based on the wheel rotation number signals transmitted from the rotation sensors 28 and 29. In step S2, the controller 11 determines whether the rotation number difference calculated in step S1 is greater than or equal to a predetermined threshold. In other words, the controller 11 determines whether or not there is a rotation number difference between the front wheels 21 and the rear wheels 22.

When there is no rotation number difference between the front wheel 21 and the rear wheel 22, that is, when the rotation number difference is smaller than the threshold value (No in step S2), the processing is ended. On the other hand, when there is a rotation number difference between the front wheels 21 and the rear wheels 22, that is, when the rotation number difference is greater than or equal to the threshold value (Yes in step S2), the controller 11 obtains a signal indicating the operation amount from the acceleration/deceleration operation element 13a in step S3.

In step S4, the controller 11 calculates the rotation number of the rear wheels 22 that reduces the rotation number difference between the front wheels 21 and the rear wheels 22. Then, in step S5, the controller 11 transmits the rotation number control signal for causing the rear wheels 22 to rotate at the calculated rotation number to the model car 3. Accordingly, in the model car 3, the ESC 23 reduces the rotation number of the travel motor 26, that is, the rotation number of the rear wheels 22, thereby suppressing slippage.

Thereafter, in step S6, the controller 11 calculates the rotation number difference between the front wheels 21 and the rear wheels 22 based on the wheel rotation number signals transmitted from the rotation sensors 28 and 29. In step S7, the controller 11 determines whether or not the rotation number difference calculated in step S6 is smaller than or equal to a predetermined constant range. In other words, the controller 11 determines whether or not the slippage has been eliminated.

When the rotation number difference between the front wheels 21 and the rear wheels 22 is not within the certain range, that is, when the slippage has not been eliminated (No in step S7), the processing returns to step S3. On the other hand, when the rotation number difference between the front wheels 21 and the rear wheels 22 is within the certain range, that is, when the slippage has been eliminated (Yes in step S7), the processing is ended.

2. Second Embodiment

[2.1. Configuration of Radio Control System]

Figure 6:
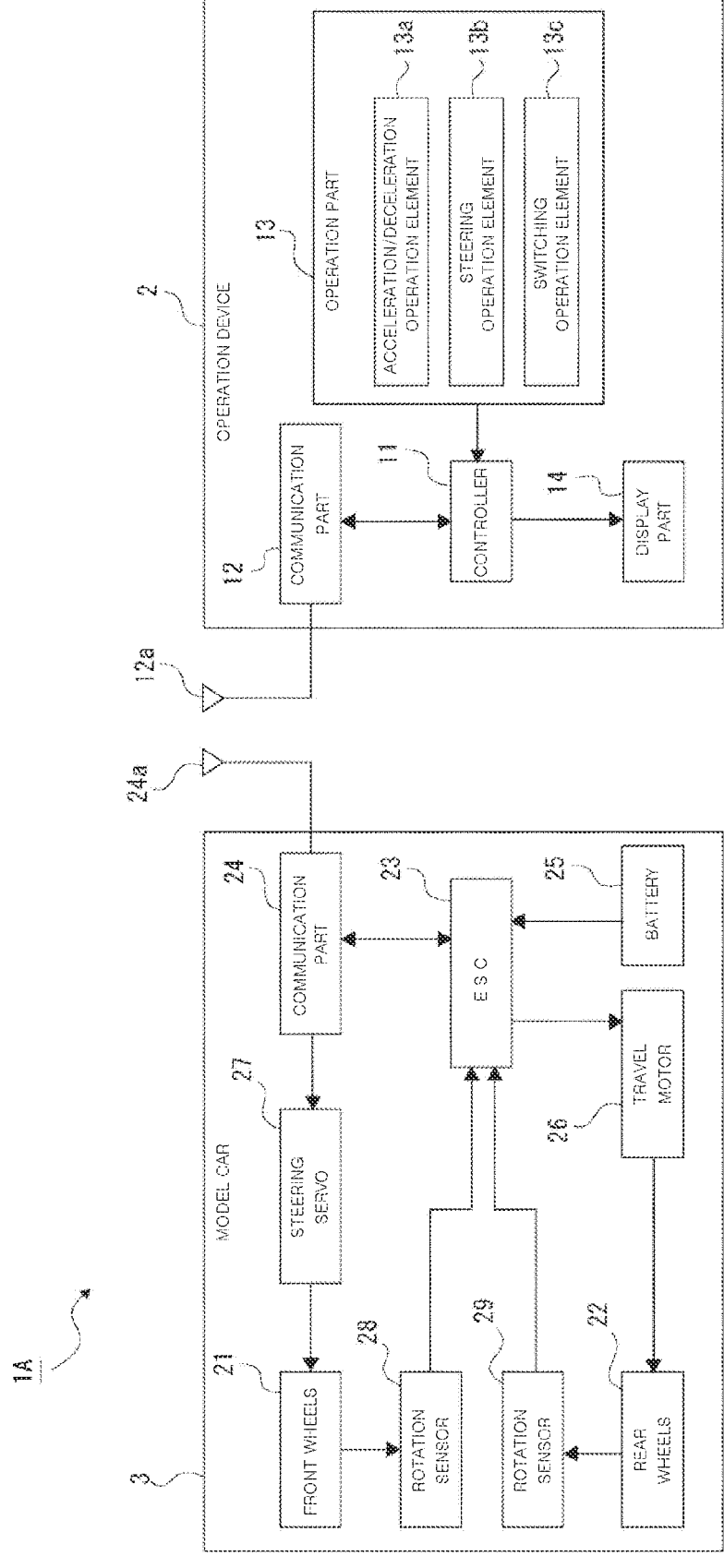
FIG. 6 explains a configuration of a radio control system 1A according to a second embodiment.

FIG. 6 explains a configuration of a radio control system 1A according to a second embodiment.

In the radio control system 1 according to the first embodiment, the wheel rotation number signals outputted from the rotation sensors 28 and 29 are inputted to the controller 11 of the operation device 2 through the communication parts 24 and 12, and the controller 11 performs the traction control.

On the other hand, in the radio control system 1A according to the second embodiment, the wheel rotation number signals outputted from the rotation sensors 28 and 29 are inputted to the ESC 23, and the ESC 23 performs the traction control.

The radio control system 1A is different from the radio control system 1 according to the first embodiment only in the above configuration, and the other configurations are the same.

[2.2. Traction Control]

Figure 7:
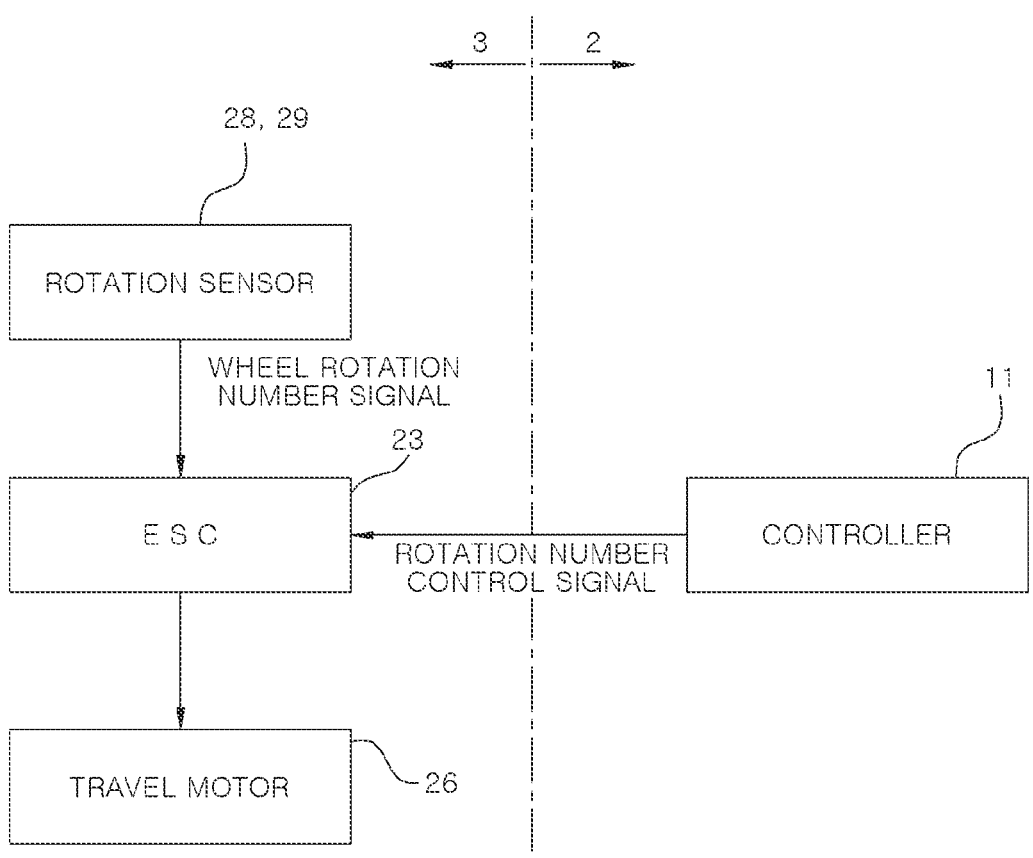
FIG. 7 explains flow of signals in traction control.

Next, the traction control will be described. FIG. 7 explains flow of signals in the traction control. In the second embodiment, the ESC 23 and the rotation sensors 28 and 29 function as a control device for performing the traction control.

The ESC 23 receives the wheel rotation number signals from the rotation sensors 28 and 29 at predetermined measurement intervals. Here, the measurement interval is an interval for detecting the rotation number using the rotation sensors 28 and 29. The measurement interval is shorter than the communication interval between the operation device 2 and the model car 3.

When the wheel rotation number signal is received, the ESC 23 calculates the rotation number difference between the front wheels 21 and the rear wheels 22. The ESC 23 determines that slippage has occurred when there is a rotation number difference between the front wheels 21 and the rear wheels 22 (when the calculated rotation number difference is greater than or equal to a predetermined threshold).

When it is determined that slippage has occurred, the ESC 23 performs the traction control such that the rotation number difference between the front wheels 21 and the rear wheels 22 is reduced (to be within a certain range). In the traction control, the ESC 23 performs the feedback control to control the rotation number such that the rotation number of the rear wheels 22 is reduced as the rotation number difference between the front wheels 21 and the rear wheels 22 increases.

For example, the ESC 23 drives the travel motor 26 such that the rotation number of the rear wheels 22 becomes the same as the rotation number of the front wheels 21 regardless of the rotation number control signal transmitted from the controller 11. Accordingly, the rotation number of the rear wheels 22 becomes the same as the rotation number of the front wheels 21, which makes it possible to eliminate the slippage.

Similarly to the first embodiment, the ESC 23 may perform an intermittent operation for alternately switching the high rotation number state and the low rotation number state of the rear wheels 22 (the travel motor 26). Accordingly, the ESC 23 drives the travel motor 26 to reduce the rotation number of the rear wheels 22, which makes it possible to eliminate the slippage.

Figure 8:
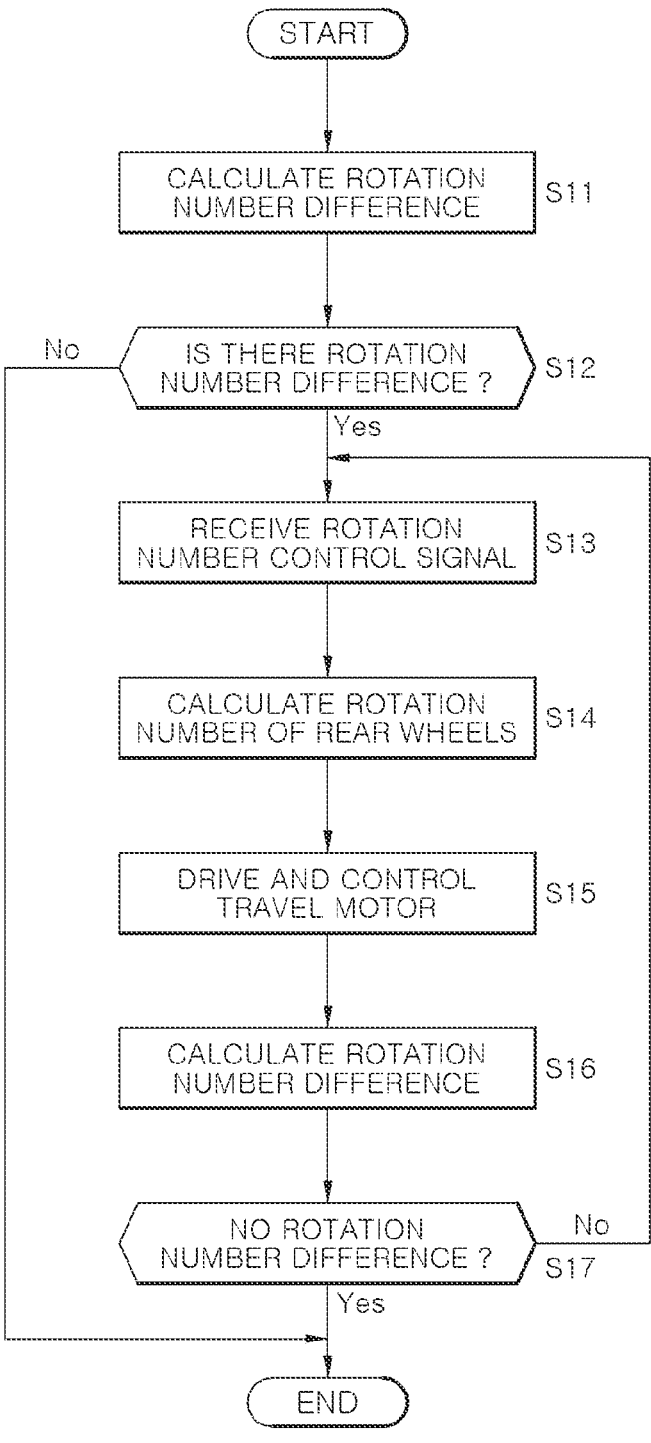
FIG. 8 is a flowchart showing flow of the traction control.

FIG. 8 is a flowchart showing flow of the traction control. It is assumed that the ESC 23 receives the wheel rotation number signals from the rotation sensors 28 and 29 at predetermined measurement intervals during the traction control shown in FIG. 8.

As shown in FIG. 8, in step S11, the ESC 23 calculates the rotation number difference between the front wheels 21 and the rear wheels 22 based on the wheel rotation number signals transmitted from the rotation sensors 28 and 29. In step S12, the ESC 23 determines whether the rotation number difference calculated in step S11 is greater than or equal to a predetermined threshold. In other words, the ESC 23 determines whether there is a rotation number difference between the front wheels 21 and the rear wheels 22.

When there is no rotation number difference between the front wheel 21 and the rear wheel 22, that is, when the rotation number difference is smaller than the threshold value (No in step S12), the processing is ended. On the other hand, when there is a rotation number difference between the front wheel 21 and the rear wheel 22, that is, when the rotation number difference is greater than or equal to the threshold value (Yes in step S12), the ESC 23 obtains the rotation number control signal transmitted from the controller 11 in step S13.

In step S14, the ESC 23 calculates the rotation number of the rear wheels 22 that reduces the rotation number difference between the front wheels 21 and the rear wheels 22. In step S15, the ESC 23 drives the travel motor 26 such that the rear wheels 22 rotates at the calculated rotation number. Accordingly, in the model car 3, the rotation number of the travel motor 26, that is, the rotation number of the rear wheels 22 is reduced, thereby suppressing slippage.

Next, in step S16, the ESC 23 calculates the rotation number difference between the front wheels 21 and the rear wheels 22 based on the wheel rotation number signals transmitted from the rotation sensors 28 and 29. In step S17, the ESC 23 determines whether the rotation number difference calculated in step S16 is smaller than or equal to a predetermined threshold. In other words, the ESC 23 determines whether or not slippage has been eliminated.

When the rotation number difference between the front wheels 21 and the rear wheels 22 is not within a certain range, that is, when the slippage has not been eliminated (No in step S17), the processing returns to step S13. On the other hand, when the rotation number difference between the front wheels 21 and the rear wheels 22 is within a certain range, that is, when the slippage has been eliminated (Yes in step S17), the processing is ended.

3. Modifications

The present disclosure is not limited to the above-described specific examples, and may adopt various modifications.

For example, in the above embodiments, the rear wheels 22 are provided as first wheels (driving wheels), and the front wheels 21 are provided as second wheels (non-driving wheels). Further, the traction control is performed based on the rotation number difference between the front wheels 21 and the rear wheels 22.

However, the first wheels and the second wheels are not limited thereto. For example, the first wheels may be the front wheels 21 and the second wheels may be the rear wheels 22. For example, in the case of a four-wheel-drive model car, each of the first wheel and the second wheel may be any one of the four wheels.

In the above embodiments, the case where the model car 3 is a four-wheel car has been described. However, any model car having two or more wheels may be used.

In the above embodiments, the travel motor 26 is provided as a driving source. However, an engine may be provided as the driving source.

4. Summary of Embodiments

As described above, the control device for the model car 3 according to the embodiment includes the rotation sensors 28 and 29 for detecting the rotation number of the first wheels (the rear wheels 22) and the rotation number of the second wheels (the front wheels 21) of the model car 3, and the controller (the controller 11 and the ESC 23) for controlling driving of the driving source (the travel motor 26) of the model car 3 such that the rotation number difference between the first wheel and the second wheel is reduced when the rotation number difference is greater than or equal to a threshold value.

Accordingly, when the wheels (the rear wheels 22) of the model car 3 slip, the control device controls the driving of the driving source (the travel motor 26) such that the rotation number difference between the front wheels 21 and the rear wheels 22 is reduced.

Therefore, the slippage of the model car 3 can be easily reduced without requiring an operator to perform various settings related to the traction control.

The first wheels (the rear wheels 22) are the driving wheels that are rotated by the driving source (the travel motor 26), and the second wheels (the front wheels 21) are the non-driving wheels that are not rotated by the driving source. The controller (the controller 11 and the ESC 23) controls the driving of the driving source such that the rotation number of the first wheels is reduced.

Accordingly, the rotation number of the rear wheels 22 as the driving wheels that may cause slippage can be reduced, thereby eliminating the slippage at an early stage.

The rotation sensors 28 and 29 are installed at the model car 3, and the controller 11 is installed at the operation device 2 for wirelessly controlling the operation of the model car 3.

Accordingly, the operation device 2 can perform the calculation for controlling the rotation number of the rear wheels 22 and, thus, the calculation amount in the model car 3 can be reduced. In other words, the power consumption and the processing load in the model car 3 can be suppressed, and the traveling distance of the model car 3 can be increased.

The rotation sensors 28 and 29 and the controller (the ESC 23) are installed at the model car 3.

Accordingly, the rotation number of the rear wheels 22 can be reduced by receiving the wheel rotation signals from the rotation sensors 28 and 29 without performing wireless communication with the operation device 2. The ESC 23 can receive the wheel rotation signals from the rotation sensors 28 and 29 at the measurement intervals shorter than the communication intervals.

Therefore, it is possible to improve the responsiveness of the traction control.

The controller (the controller 11 and the ESC 23) intermittently operates the driving source (the travel motor 26).

Accordingly, the slippage can be eliminated at an early stage.

The controller (the controller 11 and the ESC 23) can switch execution and non-execution of the driving control depending on an operator's operation of the operation element (the switching operation element 13c).

Accordingly, the on/off switching can be performed at the timing desired by the operator in such a manner that the traction control is turned off when the operator desires to intentionally slide the model car 3 and the traction control is turned on when the slippage of the model car 3 is not desired.

The invention claimed is:

1. A control device for a model car, comprising:
   a rotation sensor configured to detect a rotation number of a first wheel and a rotation number of a second wheel of a model car; and
   a controller configured to perform driving control of a driving source of the model car such that a rotation number difference between the first wheel and the second wheel is reduced when the rotation number difference is greater than or equal to a threshold,
   wherein the controller is configured to intermittently operate the driving source by alternately switching a driving wheel between a high rotation number state and a low rotation number state, thereby reducing the rotation number difference between the first wheel and the second wheel.

2. The control device for a model car of claim 1, wherein the first wheel is the driving wheel that is rotated by the driving source,
   the second wheel is a non-driving wheel that is not rotated by the driving source, and
   the controller performs the driving control of the driving source such that the rotation number of the first wheel is reduced.

3. The control device for a model car of claim 1, wherein the rotation sensor is installed at the model car, and
   the controller is installed at an operation device configured to operate the model car wirelessly.

4. The control device for a model car of claim 2, wherein the rotation sensor is installed at the model car, and
   the controller is installed at an operation device configured to operate the model car wirelessly.

5. The control device for a model car of claim 1, wherein the rotation sensor and the controller are installed at the model car.

6. The control device for a model car of claim 2, wherein the rotation sensor and the controller are installed at the model car.

7. The control device for a model car of claim 1, wherein the controller switches execution and non-execution of the driving control depending on an operator's operation of an operation element.

8. The control device for a model car of claim 2, wherein the controller switches execution and non-execution of the driving control depending on an operator's operation of an operation element.

* * * * *